C. CRAFT.
ATTACHMENT FOR CONTAINERS.
APPLICATION FILED AUG. 6, 1919.
1,384,120.
Patented July 12, 1921.
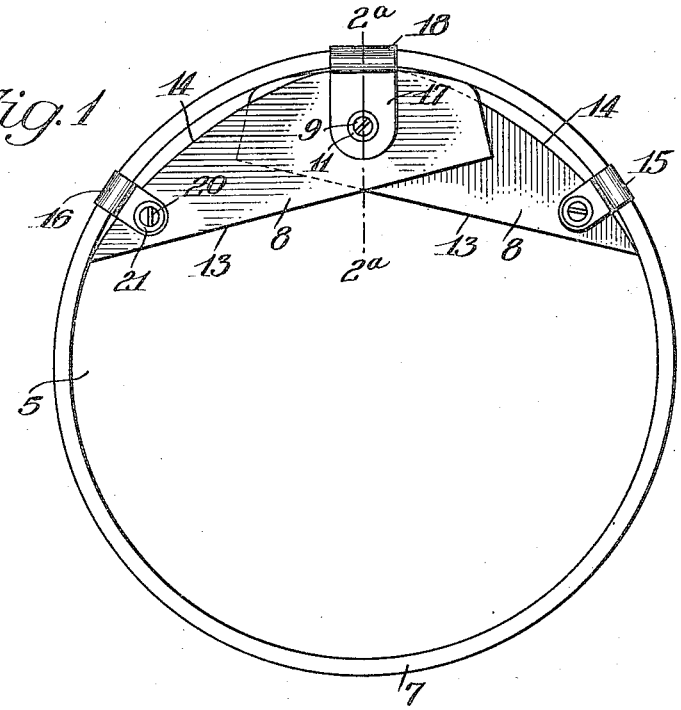
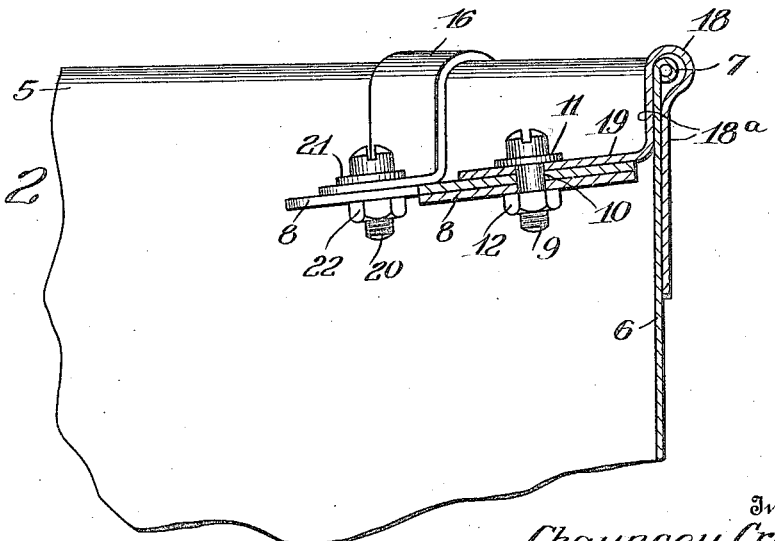
Witnesses
C. H. Cumpston
Nelson H. Copp
Inventor
Chauncey Craft
By Frederick S. Church
his Attorney

UNITED STATES PATENT OFFICE.

CHAUNCEY CRAFT, OF ROCHESTER, NEW YORK.

ATTACHMENT FOR CONTAINERS.

1,384,120.   Specification of Letters Patent.   Patented July 12, 1921.

Application filed August 6, 1919. Serial No. 315,750.

*To all whom it may concern:*

Be it known that I, CHAUNCEY CRAFT, a citizen of the United States, residing at Rochester, in the county of Monroe and State of New York, have invented certain new and useful Improvements in Attachments for Containers; and I do hereby declare the following to be a full, clear, and exact description of the same, reference being had to the accompanying drawings, forming a part of this specification, and to the reference numerals marked thereon.

This is an invention in auxiliary attachments for vessels or containers, and more especially in devices for attachment adjacent the rim of an open top container or vessel for use as a scraping and as a supporting surface in conjunction with implements or tools employed to dispense the contained material, one object being the provision of a convenient and efficient attachment for use in conjunction with the dispensing implement to manipulate the material, support the implement, and for other purposes.

Another object is the provision of a device of the above character which is simple in construction, readily placed in position or removed, and adjustable to containers of various sizes and shapes. To these and other ends the invention consists in certain improvements and combinations of parts, all as will be hereinafter more fully described, the novel features being pointed out in the claims at the end of the specification.

In the drawings:

Figure 1 is a top plan view of a container with the invention applied thereto.

Fig. 2 is a section on the line 2ª—2ª of Fig. 1.

The embodiment of the invention at present preferred, as best illustrating the principles involved, is shown in the drawings applied to a container 5, having side walls 6, and an open top adjacent which the side walls are rolled to form a bead 7, forming a common type of container, such for example as a paint can, but the invention is generally applicable, of course, to open top containers for various materials. The invention comprises a plurality of plate like members 8, preferably formed of sheet metal, the members being pivotally connected with each other for relative movement by any suitable means, as for example the bolt 9 passed through openings 10 in the members and having adjacent its head a washer 11 and on the other side of the members a securing nut 12. By this means the members are securely connected with each other, but not so tightly as to prevent their relative movement.

The forward edge of each member is preferably straight as indicated at 13, while its rear or outer edge is curved as at 14 to conform with the shape of the container, as a result of which and of the movable connection between them, the members may be adjusted to conform with the shape of the inner wall of containers of various dimensions in such a way that the outer lines of the device as a whole lie adjacent the wall of the container to facilitate its attachment to the latter by the means described below, and the forward straight edges 13 project conveniently toward the center of the pail.

Fixed to the outer ends of the member are clips 15 and 16 and at their overlapping portions a similar clip 17, each of these clips being preferably formed of more or less resilient sheet metal bent upon itself, as at 18, thus forming arms 18ª adapted to engage the opposite sides of the wall of the container, these arms being somewhat spaced from each other at 18 for providing resiliency and to accommodate any enlargement on the rim of the receptacle, as, for example, the bead 7. The arms of the clips within the container, are turned horizontally as at 19, this portion of the central clip being held to the members 8 by the bolt 9 while the corresponding portions of the clips 15 and 16 are secured to members 8 by means of bolts 20 provided with washers 21 and securing nuts 22, the clips thus being securely attached to the device in such a way that they are relatively adjustable in relation thereto by turning them on the securing bolts.

The construction described provides a device which is readily adjustable to the tops of containers of various sizes and shapes, by reason of the adjustability of the plate members relative to each other as well as the adjustability of the clips on the members and their adaptability to the wall of the container. The device is very useful in dispensing various kinds of materials from such a container, as when using for this purpose implements such as a brush or ladle. When applying paint with a brush it is desirable to have some means for removing the excess liquid from the brush and returning the same to the container. The forward edge of the device provides an excellent means for this purpose, the brush being drawn over it after being dipped into the paint and the downward inclination of the plate draining the fluid to its forward edge where it flows back into the container thus conserving material and maintaining the device in as cleanly a condition as possible. The device is useful in a similar way in conjunction with containers for butter, ice cream, etc., served by means of a ladle or similar instrument from which excess material may be removed by contact with the forward edge of the device, or in case a quantity measuring implement is used with such materials, the material may be scraped level with the top of the implement thus increasing the accuracy of measurement. The attachment is further useful as a supporting means for implements such as those described, as they may during use be temporarily deposited on the upper surface of the device, the implement being thus left within the container without soiling the surrounding surfaces, and any drainage therefrom is carried back into the receptacle.

The device is simple in construction and of an inexpensive nature as it may be manufactured largely from materials left over from other processes. Its construction renders it readily adjustable to various containers and convenient for attachment thereto for the uses described.

I claim as my invention:

1. The combination with a container having an open top, of an attachment therefor comprising a plurality of substantially plate-like members movably connected with one another to permit the conformation thereof to the interior wall of containers of different dimensions, and securing means arranged to engage over the top edges of the container for removably attaching said members to the container adjacent its top in position for removing excess material from a dispensing implement or for supporting the same.

2. The combination with a container having an open top, of an attachment therefor comprising a plurality of plates pivotally connected with one another to permit the conformation thereof to the inner wall of containers of different dimensions, and adjustable clips on said plates for removably securing said attachment to the container adjacent its top with said plates inclined at an angle to the horizontal downwardly toward the center of the container for the drainage of fluid from said plates.

3. As an article of manufacture, an attachment for containers comprising a plurality of plate members movably connected with one another to permit the adjustment of said attachment to the inner wall of containers of different dimensions, and clips movably secured to said members for adjustment in conjunction with the latter for supporting said attachment on the container adjacent the top thereof.

CHAUNCEY CRAFT.